United States Patent [19]

Barosi et al.

[11] 4,306,887

[45] Dec. 22, 1981

[54] GETTER DEVICE AND PROCESS FOR USING SUCH

[75] Inventors: Aldo Barosi; Mario Borghi, both of Milan, Italy

[73] Assignee: S.A.E.S. Getters S.p.A., Milan, Italy

[21] Appl. No.: 137,521

[22] Filed: Apr. 4, 1980

[30] Foreign Application Priority Data

Apr. 6, 1979 [IT] Italy ............................ 21653 A/79

[51] Int. Cl.³ ............................................ B01D 53/04

[52] U.S. Cl. ........................................ 55/68; 55/74; 75/177

[58] Field of Search ...................... 55/16, 68, 74, 387; 75/177; 252/472; 313/174, 176, 181; 316/25; 417/48-51, 53

[56] References Cited

U.S. PATENT DOCUMENTS

| | | | |
|---|---|---|---|
| 1,248,648 | 12/1917 | Grenagle | 75/177 |
| 2,184,769 | 12/1939 | Alexander | 75/177 X |
| 3,609,064 | 9/1971 | Giorgi et al. | 55/387 X |
| 3,762,995 | 10/1973 | Gulbransen et al. | 313/174 X |
| 3,780,501 | 12/1973 | della Porta et al. | 55/387 X |
| 3,953,755 | 4/1976 | Kuus et al. | 417/48 X |
| 3,961,897 | 6/1976 | Giorgi et al. | 55/387 X |
| 4,069,303 | 1/1978 | Yamadaya et al. | 75/177 X |
| 4,071,335 | 1/1978 | Barosi | 55/68 |
| 4,127,790 | 11/1978 | Kuus et al. | 417/48 X |
| 4,163,666 | 8/1979 | Shaltiel et al. | 75/177 |
| 4,203,049 | 5/1980 | Kuus | 313/174 |

FOREIGN PATENT DOCUMENTS 934983 8/1963 United Kingdom .................. 417/48

OTHER PUBLICATIONS

Anderson et al., A Preliminary Survey of Zirconium Alloys, Bureau of Mines Report 4658, 3/50, pp. 24–30, U.S. Dept. of Interior.

*Primary Examiner*—Robert H. Spitzer
*Attorney, Agent, or Firm*—Quaintance & Murphy; Murphy & Richardson

[57] ABSTRACT

Zr-Fe alloys (15%–30% by wt Fe, balance Zr) start to sorb hydrogen at temperatures between 200° and 250° C. They are particularly useful for the sorption of hydrogen within the outer jacket of high intensity discharge lamps.

2 Claims, 5 Drawing Figures

GETTER DEVICE AND PROCESS FOR USING SUCH

BACKGROUND OF THE INVENTION

The use of various materials for the sorption of gases is well known. Charcoal and zeolites are examples of non-metallic gas sorbers. Metallic gas sorbers or getters are also commonly used. Barium is particularly well known for its ability to sorb large quantities of gas very rapidly. Due to the high reactivity of barium metal, it is usually handled in the form of an alloy, with aluminum, for instance, in about a 50% weight ration. When it is desired to start sorption of gases in, for example, a thermionic valve or a television picture tube, the barium is released by heating the barium-aluminum alloy, whereupon barium evaporates, depositing or condensing upon the walls of the device in which it is being used. The evaporated film of barium is then capable of sorbing gases, maintaining a high vacuum within the device. In certain circumstances, it is undesirable to have an evaporated metallic film. In this case, use is made of a metal or alloy which is capable of sorbing gases even though the metal has not been evaporated. Such getter materials are called non-evaporable getters. One example is described in U.S. Pat. No. 2,926,981 and relates to the use of zirconium-titanium alloys. A particularly well known non-evaporable getter alloy of zirconium with aluminum is described in U.S. Pat. No. 3,203,901. Usually these gettering alloys are covered with a passivating layer of oxides and nitrides, which are removed by means of a heat treatment or activating process before the alloy is capable of sorbing gas. The activation process usually involves heating the getter metal to temperatures of 800°-900° C. for a period of tens of seconds to a few minutes. If the getter metal is not activated, it may still be capable of selectively sorbing gas if the metal is simply heated to a given temperature. This may be a desirable property. For instance, A Barosi and E. Rabusin in Japan J. Appl. Phys. Suppl. 2, Pt. 1, 1974 p. 49-52, describes the use of the aforementioned zirconium-aluminum alloy in high intensity discharge lamps. These lamps have a nitrogen gas filling within the outer glass envelope. Hydrogen impurity is dangerous to lamp operation. It is found that the use of a non-activated zirconium-aluminum alloy, if heated to about 400° C.±50° C. without a prior activation step, is capable of removing the undesirable hydrogen without continuously sorbing nitrogen. Unfortunately, in some lamps, it may be difficult to find a position to mount the getter alloy where it can reach 400° C. during lamp operation. If such a position is available, it may only be possible to maintain the temperature if the lamp is in a predetermined position. This limits the flexibility of use of the lamp.

Intermetallic compounds such as $Zr_2Ni$ have also been used as selective getters as described in U.S. Pat. No. 4,071,335. However, the particular advantage of $Zr_2Ni$ is its ability to sorb water vapour without releasing hydrogen. The speed with which it sorbs hydrogen at low temperatures is very low. In an atmosphere of hydrogen at a pressure of 1 torr and at a temperature of 250° C., non-activated $Zr_2Ni$ sorbs only 2.2 cc torr in a period of 3 hours.

G. Kuus in Digest No. 1978/29 of the IEE Electronics Division describes the use of a not better specified "Zr-Ni getter" as a hydrogen getter inside the outer bulb of a high pressure metal iodide lamp.

BRIEF OBJECTS OF THE INVENTION

It is therefore an object of the present invention to provide an improved getter device for the sorption of hydrogen.

It is therefore another object of the present invention to provide an improved getter device capable of starting to sorb hydrogen at a temperature between 200° and 250° C.

It is yet another object of the present invention to provide an improved getter device capable of sorbing hydrogen in the presence of other gases.

It is yet another object of the present invention to provide an improved getter device capable of sorbing hydrogen in the presence of nitrogen.

It is yet another object of the present invention to provide an improved getter device adapted for use in the outer jacket of high intensity discharge lamps.

It is yet another object of the present invention to provide an improved getter device adapted for use in the outer jacket of high intensity discharge lamps which allows the discharge lamp to operate in any spacial orientation.

These and other objects and advantages will become clear to those skilled in the art by reference to the following detailed description and drawings wherein.

Figure 1:
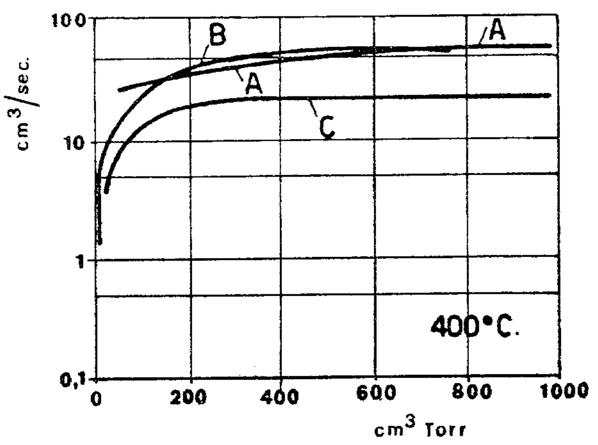
FIG. 1 is a graph showing the hydrogen sorption properties of the non-evaporable getter intermetallic compound used in a getter device of the present invention compared with the hydrogen sorption properties of two prior art getter materials at 400° C.

According to the present invention, there is provided a getter device for the sorption of hydrogen at low temperatures comprising a holder and a powdered getter metal supported by said holder wherein the getter metal comprises an alloy of zirconium and iron having a composition by weight of 15% to 30% iron balance zirconium. The particle size of the gettering alloy should be such as to provide a large surface area for sorption. The particles can vary widely in size but generally are between 1 and 300 microns and preferably are between 1 and 125 microns. The holder may be any holder capable of supporting the getter alloy. For instance, as a substrate into which the particles are at least partially embedded, a ring-shaped channel or tablet will suffice. The powdered getter metal comprises an alloy of zirconium and iron having a composition by weight of from 15% to 30% iron, balance zirconium. Preferably the alloy should have a composition 23.4% by weight iron and 76.6% by weight zirconium. This corresponds to an atomic weight ratio Zr:Fe of 2:1.

It is believed that when a melt having the above composition cools to about 1150° C., crystals of $ZrFe_2$ form until the temperature reaches about 1100° C. At this temperature, there should be the formation of the phase $Zr_2Fe$ by means of a peritectic reaction between the liquid and the $ZrFe_2$. When the reaction is complete and the temperature again decreases, crystals of $Zr_2Fe$ form. Upon reaching 947°±5° C., the remaining eutectic liquids solidify into $Zr_2Fe$ and $\beta$-Zr. Further cooling to about 850° C. initiates a peritectoid reaction between $\beta$-Zr and $Zr_2Fe$ with the formation of a small amount of $Zr_4Fe$. However, this latter reaction can take place only if the rate of cooling is very slow. The rate of cooling affects the whole solidification process.

It is believed that the presence of the $Zr_2Fe$ phase is somehow instrumental in conferring upon the 15–30 wt % Fe alloys with Zr their superior hydrogen sorption properties. The intermetallic compound $Zr_2Fe$ has been described by F. A. Shunk in "Constitution of Binary Alloys, Second Supplement" McGraw-Hill, Inc., N.Y., 1969 Pages 354–356. Shunk makes no indication that it is capable of sorbing hydrogen. Furthermore, the intermetallic compound referred to by Shunk as $Zr_2Fe$ is probably not a stoichiometric compound. Instead, it has a composition range $Zr_{2-x}Fe$.

F. N. Rhines and R. W. Gould in Adv. X-Ray Anal. Vol. 6 (1962) p. 62–73 have also performed a metallographic study of Zr-Fe alloys having from 5% to 55% by weight of iron.

In the paper by A. Pebler and A. Gulbransen in "Electrochemical Technology" Vol. 4, No. 5–6, May-June 1966, p. 211–215, the reaction of hydrogen with various intermetallic compounds of zirconium was studied. They report "Intermetallic systems like $ZrFe_2$ and $ZrCo_2$ absorb only small amounts of hydrogen under the stated experimental conditions". They give the conditions as "( . . . ) reaction of hydrogen ( . . . ) in the pressure range $10^{-4}$ torr to 1 atm and the temperature range 25°–900° C.". This report also studies the hydrogen sorption behavior of the intermetallic compound $Zr_2Ni$.

Though prior art indicates that Zr-Fe alloys ($ZrFe_2$) are poor hydrogen sorbers, it has been unexpectedly found that in the temperature range of 200°–400° C., the hydrogen sorption characteristics of Zr-Fe getter alloys (having a composition 15%–30% by weight Fe, balance Zr) are superior to those of prior art hydrogen getters. Furthermore, the hydrogen sorption characteristics are found to be not affected by the contact of nitrogen with the getter alloy.

Referring now to the graphs, the ordinate shows the hydrogen sorption speed while the abscissa shows the quantity of hydrogen sorbed. These graphs have been obtained from experimental observations carried out on getter devices using alloys of the present invention and for comparative purposes, on prior art alloys. The experiments were performed in the following manner.

A powder sample of the gettering alloy having a particle size such that it passes through a screen of 120 mesh per inch, was compressed with a force of 3000 kg into a traditional U-shaped ring holder. In order to have reproducible surface conditions, the getter devices were subjected to a normalizing treatment, before conducting gas sorption tests. These tests consisted of: (1) heating the getter devices in a vacuum of better than $10^{-5}$ torr at a temperature of 850° C.–900° C. for 1 minute (i.e., activation to clean the surface); (2) allowing them to cool down in vacuum to room temperature; (3) exposing the getter devices to air for 1 night to de-activate the getter device in a uniform manner; (4) performing the hydrogen sorption test.

The hydrogen sorption characteristics of the getter devices were obtained from the following tests. The getter devices were placed in a vacuum chamber which was then evacuated to better than $10^{-5}$ torr. The device was then heated to the desired test temperature. Then a known quantity of gas was introduced into the system at a pressure of $2\times10^{-2}$ torr. When the pressure dropped to below $10^{-3}$ torr, a new dose of hydrogen was introduced. The pressure of the hydrogen was measured at known intervals of time during gas sorption thus allowing calculation of the hydrogen sorption speed.

Referring now to FIG. 1, Curve A shows sorption speed vs quantity sorbed, obtained in the above manner, for a getter device using a Zr-Fe alloy of the present invention having an atomic ratio of Zr:Fe of 2:1 and at a getter device sorption temperature of 400° C. Curve B relates to the results obtained by using a getter device with the prior art intermetallic gettering compound $Zr_2Ni$. Curve C shows the results obtained by using a getter device with a prior art alloy of zirconium with aluminum having a composition of 16% by weight aluminum, balance zirconium.

Figure 2:
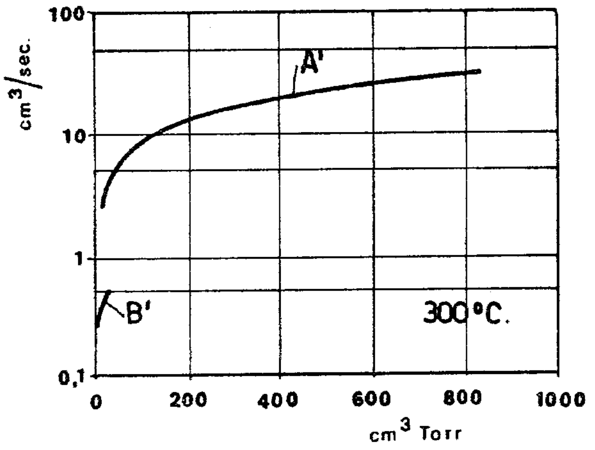
FIG. 2 is a graph showing the hydrogen sorption properties of the non-evaporable getter intermetallic compound used in a getter device of the present invention compared with the hydrogen sorption properties of a prior art getter material at 300° C.

FIG. 2 shows the results of a repeat of the tests leading to FIG. 1, on new getters prepared exactly as described above except that the getter devices were caused to sorb hydrogen at 300° C. Curve A' shows the sorption characteristics of the Zr-Fe getter device of the present invention. Curve B' shows the sorption characteristics of the known $Zr_2Ni$ getter device. No sorption was detected for the Zr-Al getter device.

Figure 3:
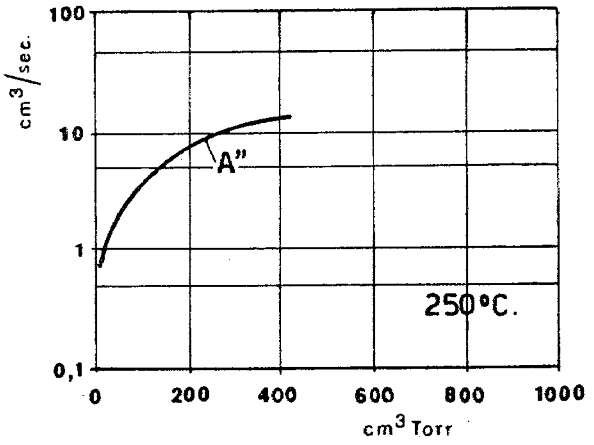
FIG. 3 is a graph showing the hydrogen sorption properties of the non-evaporable getter intermetallic compounds used in a getter device of the present invention at 250° C.

FIG. 3 shows the results of another repeat of the tests leading to FIG. 1. New getters were prepared exactly as described above except that the Zr-Al getter device was omitted as it had already ceased to sorb $H_2$ at 300° C. The getter devices were caused to sorb hydrogen at 250° C. Curve A" shows the sorption characteristics of the Zr-Fe getter devices of the present invention. No sorption was detected for the $Zr_2Ni$ getter device.

Figure 4:
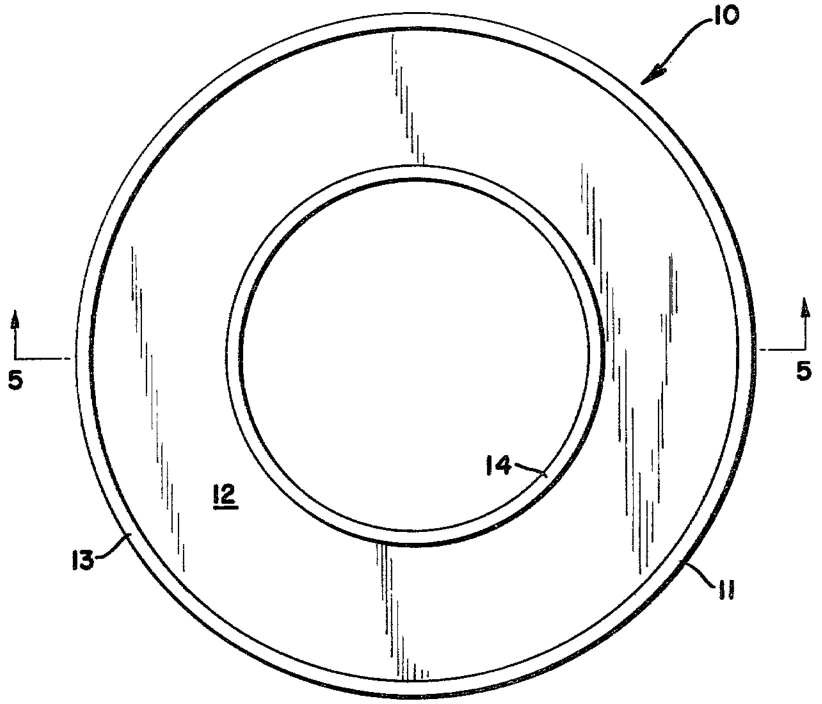
FIG. 4 is a plan view of a getter device suitable for use in the present invention.

FIG. 4 shows a getter 10 having side walls 11 and 14 joined to a bottom wall 12.

Figure 5:
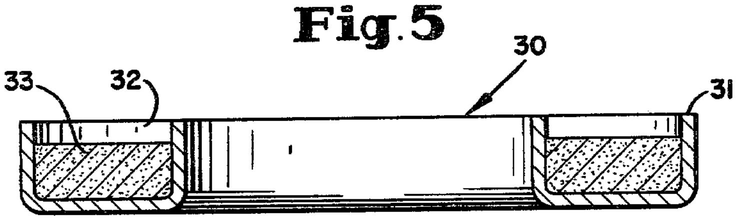
FIG. 5 is a sectional view taken along Line 5—5 of FIG. 4.

FIG. 5 shows a getter container 31 with side wall 32. The getter material 33 is packed into getter container 31.

Additional tests were performed to show that the Zr-Fe alloys of the present invention can also be used in a nitrogen environment. A getter device comprising 150 mg of powdered Zr-Fe of the present invention was placed in a vessel which was then filled with nitrogen to a pressure of 3 torr. The getter device was heated to a temperature of 400° C. Every half-hour the nitrogen was removed and hydrogen was admitted at a pressure of $2\times10^{-2}$ torr. The tests indicate that the hydrogen was pumped as if nitrogen had not been present. The test resulted in the exposure to nitrogen for a total time of 3 hours.

The test was repeated on fresh getter devices at both 300° C. and 250° C., with the same results.

DISCUSSION OF THE RESULTS

From the graph of FIG. 1, it can be seen that at 400° C. the getter devices of the present invention have hydrogen sorption characteristics at least as good as the sorption characteristics of prior art getter devices.

The graphs of FIGS. 2 and 3 show that at temperatures below 400° C. the Zr-Fe getter devices of the present invention have superior gettering characteristics when compared with those of prior art getter devices.

It should be noted that curve B′ on FIG. 2 is very short. This is because the pumping speed of the $Zr_2Ni$ intermetallic compound is very low at 300° C. and one full day of experimental observations were necessary to obtain the data reported.

The increase in sorption speed as a function of quantity of hydrogen sorbed is probably caused by breaking down of the passivating surface barrier by the hydrogen as explained by G. Kuss et al in Vacuum, Vol. 27, No. 3, 1977 p. 93–95.

The tests with nitrogen shown that the presence of nitrogen does not inhibit the sorption of hydrogen by the getter devices of the present invention.

What is claimed is:

1. A method for sorbing hydrogen in a vacuum tube comprising the steps of
   - I. introducing into the vacuum tube a powdered getter metal which is an alloy of from 15 to 30 weight percent iron, balance zirconium; and then
   - II. heating the getter metal to a temperature at which hydrogen sorption commences.

2. A method of sorbing hydrogen in a vacuum tube comprising the steps of:
   - I. introducing into the vacuum tube a powdered getter metal, having a particle size of from 1 to 125 microns, wherein the getter metal consists essentially of $Zr_2Fe$; and then
   - II. heating the powdered getter metal to a temperature of 200° to 250° C.; and then
   - III. sorbing hydrogen by means of the powdered getter metal in the presence of nitrogen.

* * * * *